Dec. 21, 1954 J. L. LAWSON 2,697,782

PULSE POTENTIAL TRANSDUCER

Filed Nov. 30, 1945

INVENTOR
JAMES L. LAWSON

BY M. C. Hayes

ATTORNEY

United States Patent Office 2,697,782

Patented Dec. 21, 1954

2,697,782

PULSE POTENTIAL TRANSDUCER

James L. Lawson, Cambridge, Mass., assignor, by mesne assignments, to the United States of America as represented by the Secretary of the Navy Application November 30, 1945, Serial No. 631,948

5 Claims. (Cl. 250—27)

Figure 1:
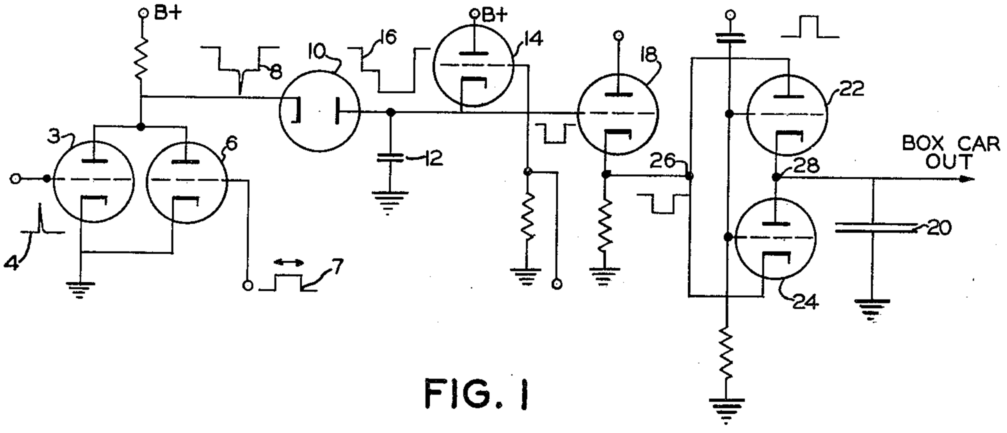

This invention relates in general to a so-called boxcar circuit for producing an output voltage which assumes the peak value of an input pulse and holds this value substantially unchanged until another input pulse occurs, at which time the output assumes the peak value of this pulse whether higher or lower than the preceding value, and again sustains it until the next input pulse. Such circuits are useful in many radar adaptations, for instance, in gun laying, or as an audio frequency demodulator, for automatic gain control of certain radar receivers. Various other uses are also found for this type of circuit which functions to maintain a voltage output on a level with the peak amplitude of a short video pulse until the next pulse comes along.

In the ideal boxcar generator circuit, a condenser is charged or discharged to the actual pulse voltage at the exact time a video pulse is obtained, and then immediately disconnected from the charging circuit. It is reconnected to the video circuit at the instant of the next video pulse and again disconnected as before. Since the output voltage is taken from the condenser, there will be abrupt changes at the occurrence of pulses (assuming inequality of various particular pulses), with the voltage remaining constant in each interim. Of course the output may have to be taken off through a cathode follower tube.

Important requirements for a boxcar generator are that the output condenser be charged very rapidly in order to charge completely to peak in response to a very short duration pulse, and on the other hand that the pulse repetition frequency be kept from appearing in the output when the video pulses have successive equal amplitudes, and that the boxcar output have a low hum flutter component and a very slow drooping in value between pulses. In order to counteract the last named effects of instability, relatively large capacity in the output condenser is essential, while the requirement of quick charging and discharging during the period of a very short video pulse would seem to indicate necessity for a relatively small capacity in the same circuit element. This dilemma is overcome by stretching the short video pulse, for example of the order of $\frac{1}{30}$ of a microsecond, to a duration for example of 10 microseconds, which latter period, (or even about half of it which is actually used) is adequate to permit the output condenser to be fully charged to the peak value even though it is of a relatively large capacity.

After the output condenser has, by use of an applied clamping voltage, been charged to the peak value of the pulse, it is disconnected again and allowed to remain isolated from the input until the next pulse. Since the capacitor is relatively large and the resistance to discharge practically infinite except for leakage, the output will remain flat for a considerable period of time. The large size of the capacitor also tends to reduce the A. C. leakage percentage resulting from capacity to the heater leads and thus reduce the peak to peak output hum as well as the D. C. leakage drop across the output capacitor.

In order that the peak value of each gated pulse may be applied to the clamping circuit and the output capacitor, the capacitor which stretches the input video pulse is each time discharged after performing its function so as to be ready for the next gated pulse.

It is the principal object of this invention to provide a circuit which will produce an accurate high quality boxcar output in response to very short video input pulses. It is another object to provide a circuit in which an output capacitor large enough to minimize leakage droop and alternating hum and undesired alternating components from pulse repetition frequency in a boxcar output, may be caused to be fully charged by a video pulse of very short duration to the peak value of said pulse, through the device of stretching said video pulse to a duration long enough to permit such peak charging. It is another object of this invention to provide a circuit in which each very short video input pulse of a series of pulses may be gated and stretched to a predetermined length sufficient to charge a relatively large capacitor which may then be disconnected from the input until the next pulse occurs, thereby producing an output voltage which follows the peak values of the various pulses and remains flat in between. Other objects, features and advantages of the invention will be found in the following detailed description.

Figure 2:
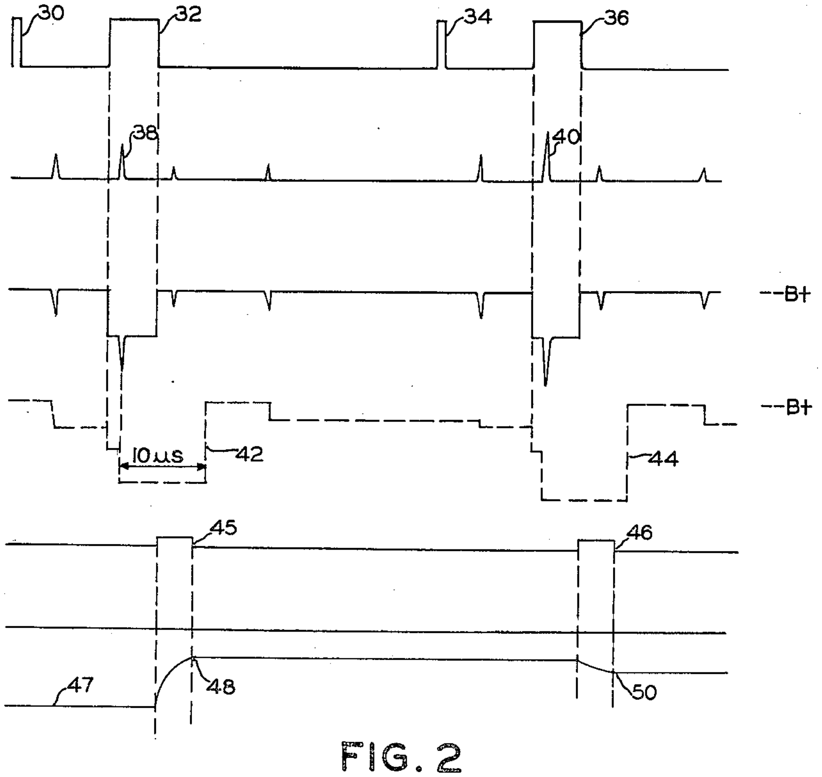

Fig. 1 is a circuit diagram of a circuit embodying this invention which receives a series of input video pulses of varying amplitudes and produces a boxcar output therefrom; and Fig. 2 is a graph showing the voltage time relations of the various pulses and gates.

Referring now to Fig. 1, there are two tubes 3 and 6 having their respective plates and cathodes in parallel. To the grid of one tube 3 are applied the video pulses (such as 4) from a selected radar target, while on the grid of the other tube is applied a positive movable gate 7 from a source of timing voltages (not shown), adjustable in order to correspond to the desired target video signal 4. The plate voltage of the two tied tubes 3 and 6 will drop by an amount depending upon the amplitude of the gate and the variable amplitude of the respective pulses, as shown by wave form 8. When the plate voltage drops, the diode 10, connected to the plate, conducts and reduces the potential of capacitor 12 by an amount equal to the drop in the plate voltage. When the plate voltage as shown by wave form 8 again rises the diode 10 ceases to conduct and so the capacitor 12 remains at the potential of the minimum peak value of the plate voltage drop because no conductive path is open. This process may be referred to as "stretching" the gated input pulse 4 because the peak value of the gated input pulse 4 is maintained for a duration much longer than the pulse itself. In this case, for example, an input pulse of as small duration as $\frac{1}{30}$ of a microsecond may be made to give an output related to and dependent on the peak value of the particular gated pulse and of duration as long as desired, and for the purposes of this particular circuit of length 10 microseconds. Indeed the capacitor 12 would remain charged indefinitely and so stretch the gated pulse indefinitely except that a switch tube 14 is connected across capacitor 12 and activated by a positive pulse from a timing source (not shown) placed on its grid about 10 microseconds after the occurrence of the gate pulse 7. This causes the capacitor 12 to be brought to the potential of B+ immediately and so raise the trailing edge of the stretched output pulse wave form back to its initial B+ value, as shown by wave form 16. This procedure prepares the capacitor 12 to be ready to be charged by the succeeding gated pulse to its particular peak value. The output from capacitor 12 then will be a series of stretched pulses each being of an amplitude dependent on the peak amplitude of the respective gated input pulse which caused it. There will be other fluctuations intermediate the stretched pulses caused by ungated video signals, but these variations will not affect the final desired results.

These stretched pulses, each 10 microseconds long but of varying amplitudes, are fed through a cathode follower tube 18 to a clamping circuit which allows the large boxcar output capacitor 20 to charge to the peak pulse value of the stretched pulse and then disconnects the capacitor 20 leaving it to hold the peak value until the occurrence of the next pulse. In this way the output is flat between pulses and is at a level dependent on the last preceding gated pulse peak at any given time. It should be noted that any video signals which occur during the 10 μ seconds that the desired signal is stretched cannot change the potential on condenser 12 unless it exceeds in amplitude the combined amplitude of the desired signal and the gate together. Hence, ungated signals will not affect the operation.

The clamping circuit consists of two tubes 22 and 24, with cathode of each in series with the plate of the other, with no other impedance in the loop. The stretched pulse is applied at a point 26 between the cathode of tube 24 and the plate of tube 22 while the output from the loop is taken from a point 28 between the cathode of tube 22 and the plate of tube 24. While the peak value of the stretched pulse 15 is present at point 26, a positive clamping pulse is applied to the grids of both tubes 22 and 24 from a timing source (not shown) at about the mid-time of the 10 microsecond stretched pulse, causing the clamping circuit to conduct thereby connecting point 28 to point 26, hence point 28 will assume the same potential as point 26, namely the peak value of the stretched pulse. Likewise the main boxcar output capacitor 20 has approximately 5 microseconds in which to charge up to the same pulse peak potential. Variations of potential at point 26 due to ungated signals which may occur in the absence of the clamping pulse can have no effect on capacitor 20.

When the clamping pulse terminates however, (which should be earlier than the stretched pulse) both tubes 22 and 24 isolate the boxcar output condenser 20 from the input circuit, making its discharge time constant very large because of the practically infinite resistance, hence the output remains flat for a considerable period of time. When the next input pulse comes along, and the clamping pulse induces conduction again in the clamping circuit, the output capacitor 20 can rapidly adjust itself to the new value whether it has increased or decreased from the peak value of the preceding pulse, since it now has comparatively little resistance in the loop between points 26 and 28. With this arrangement the output capacitor can be made as large as 1000 micro-microfarads which will reduce A. C. leakage due to capacity to the heater leads and will thus reduce the peak to peak output hum, as well as reduce the D. C. leakage droop across the capacitor. Moreover pulse repetition frequency and its harmonics and other undesirable output components will be minimized both because of the substantial size of the capacitor 20 and because of the manner by which its charge is governed.

Fig. 2 is a diagram showing the various wave forms and their time relationships. On the top line is indicated the transmitted pulse 30 and a movable range gate 32 corresponding to gate 7 of Fig. 1 and a second transmitted pulse 34 and similar gate 36 following it. On the second line is indicated various video pulses received from targets, in particular a gated video pulse 38 and following the second transmitted pulse 34 at the same range another video pulse 40. On the third line appears the corresponding graph of the joint plate potential of the tubes 3 and 6, and on the fourth line stretched pulses 42 and 44. On the next line appears the clamping pulses 45 and 46 timed to occur at about the time center of the stretched pulse. Finally there is shown in the last line the form of the potential across the boxcar output condenser 20. The initial level at 47 is the result of a preceding pulse, not shown, while the effect of stretched pulses 42 and 44 shown at 48 and 50 respectively.

While one specific circuit has been shown as an embodiment of the principles of this invention it should be understood that the idea of pulse stretching to provide extra time for charging a larger capacitor in order to reduce undesired output components can be applied in other circuits to enable the obtaining of a good quality boxcar output from very short video pulses. Hence this invention should not be considered limited to the embodiment shown but only by the prior art and the spirit of the appended claims.

What is claimed is:

1. An electrical circuit for producing an output voltage proportional to the peak voltage of each input pulse of a selected recurrent series of pulses and constant for the period between successive pulses comprising a storage capacitor, means for initiating a secondary pulse proportional in amplitude to said input pulse, means for terminating said secondary pulse at a time duration less than the period of pulse repetition longer than said input pulse and comparable to the charging period of said capacitor, and means for coupling said capacitor to said pulse initiating means during the time interval of said secondary pulse for charging said capacitor from said secondary pulse.

2. An electrical circuit for producing an output voltage proportional to the peak voltage of an input pulse and constant for the period between successive pulses, comprising an output storage capacitor, means responsive to said input pulse to produce an output potential proportional in amplitude to said input pulse, a secondary capacitor, means to charge said secondary capacitor to the potential of said output potential, means to discharge said secondary capacitor within the pulse repetition period thereby producing a secondary pulse having a time duration longer than said input pulse but less than the period of input pulse repetition and comparable to the charging period of said output capacitor, and means coupling said storage capacitor to said secondary capacitor during the time interval of said secondary pulse to charge said output storage capacitor from said secondary pulse.

3. An electrical circuit for producing an output voltage proportional to the peak voltage of each input pulse of a selected series of recurrent pulses and constant for the period between successive pulses comprising, a storage capacitor, means for selecting a predetermined recurrent series of pulses, means for initiating a secondary pulse proportional in amplitude to said selected input pulse, means for terminating said secondary pulse at a time duration longer than said input pulse but less than the period of pulse repetition, and means for coupling said storage capacitor to said pulse initiating means during the time interval of said secondary pulse for charging said capacitor to the amplitude of said secondary pulse.

4. An electrical circuit for producing an output voltage proportional to the peak voltage of each input pulse of a particular series of recurrent pulses selected from a plurality of series of pulses, comprising means for selecting a predetermined series of pulses, a first capacitor, means to charge said capacitor to a potential corresponding to the peak voltage of an input pulse, means to restore said capacitor to an initial reference potential at a predetermined time interval following the occurrence of said input pulse thereby producing a secondary pulse of predetermined time duration, a cathode follower circuit responsive to the potential of said capacitor to produce an output voltage proportional thereto, a storage capacitor, a normally nonconducting circuit coupling said storage capacitor to said cathode follower circuit, and means for biasing said coupling circuit to conduction at a time interval following the occurrence of said input pulse and during the time of occurrence of said secondary pulse.

5. An electrical circuit responsive to a selected series of short recurrent pulses to produce a voltage which is constant between two successive pulses of said series at an amplitude proportional to the peak voltage of the earlier of said two pulses comprising, a first normally nonconducting electron tube adapted to become conducting in response to said pulses, a second normally nonconducting electron tube, means for biasing said second tube to conduction for a period of time adjustable with respect to time of occurrence to correspond to said selected pulse, a diode peak voltage detector, said first and second tubes having a common plate load connected to the cathode of said diode, a first capacitor connected between the plate of said diode and ground and adapted to be discharged upon conduction of said diode in response to said first and second electron tubes, a third normally nonconducting electron tube shunting said capacitor, means for biasing said third tube to conduction at a predetermined time interval following the period of conduction of said second tube to recharge said capacitor, whereby a secondary pulse having an amplitude proportional to said pulse and a suitable time duration within the period of pulse repetition is produced, a cathode follower circuit, an output storage capacitor, fourth and fifth normally nonconducting electron tubes, means biasing said fourth and fifth electron tubes to conduction during the period of discharge of said first capacitor to connect said output storage capacitor through said cathode follower circuit to the potential of said first capacitor to charge said output capacitor to the same potential as said secondary pulse.

(References on following page)

References Cited in the file of this patent

UNITED STATES PATENTS

| Number | Name | Date |
|---|---|---|
| 2,373,545 | Cooper et al. | Apr. 10, 1945 |
| 2,392,632 | Berry | Jan. 8, 1946 |
| 2,419,340 | Easton | Apr. 22, 1947 |
| 2,451,632 | Oliver | Oct. 19, 1948 |
| 2,456,050 | Cooney | Dec. 14, 1948 |
| 2,466,705 | Hoeppner | Apr. 12, 1949 |
| 2,468,687 | Schmitt | Apr. 26, 1949 |
| 2,532,338 | Schlesinger | Dec. 5, 1950 |